United States Patent [19]

Riesen

[11] 4,011,349

[45] Mar. 8, 1977

[54] DIETETIC CHOCOLATE COMPOSITION

[76] Inventor: Alfred Riesen, 6405 Immensee, Switzerland

[22] Filed: Sept. 24, 1975

[21] Appl. No.: 616,138

[52] U.S. Cl. .............................. 426/548; 426/584; 426/631; 426/804

[51] Int. Cl.² .................................. A23G 1/00

[58] Field of Search .......... 426/548, 584, 631, 804, 426/593, 585

[56] References Cited

UNITED STATES PATENTS

| 3,259,506 | 7/1966 | Eisenstadt | 426/548 |
| 3,325,293 | 6/1967 | Meyer | 426/548 |
| 3,438,787 | 4/1969 | Du Ross | 426/548 |
| 3,649,647 | 3/1972 | Ota et al. | 426/631 |
| 3,769,030 | 10/1973 | Kleinert | 426/631 |

OTHER PUBLICATIONS

Williams, Chocolate and Confectionery, Leonard Hill Ltd., London, 1950, pp. 61, 138, 139, 140 and 141.

Primary Examiner—Jeanette M. Hunter

[57] ABSTRACT

Dietetic chocolate compositions having a specific proportion of ingredients and a combination of sorbitol and cyclamate or saccharin which results in an extremely appealing taste.

4 Claims, No Drawings

DIETETIC CHOCOLATE COMPOSITION

This invention relates to new chocolate compositions, and more particularly, dietetic chocolate compositions.

Attempts at production of dietetic chocolate candy with reduced caloric content and/or low sugar content have led to products which mostly are poor substitutes, with a small percentage achieving what might be classified as even palatable, leaving much to be desired by the chocolate candy consumer who for reasons of health, e.g., latent diabetes, is restricted from the well-known chocolate products of high caloric and carbohydrate content.

Chocolate flavored beverages and frozen deserts of low carbohydrate content have been described in the prior art, as in U.S. Pat. Nos. 2,876,104 and 3,806,607, in which natural sugar is replaced by synthetic sweetners, e.g. saccharin and cyclamate sweetners. Sorbitol has been employed in the production of solid sugarless confections as described in U.S. Pat. Nos. 3,438,787 and 3,738,845. The use of soya as a complex with lecithin in long-lasting confections has been described in U.S. Pat. No. 2,740,720. Chocolate products made with skim milk are described in U.S. Pat. Nos. 2,760,867 and 2,851,365.

The present invention provides new dietetic chocolate compositions containing specific ingredients at specific levels as hereinafter described which compositions in the form of finished chocolate candy products have excellent smoothness and extremely appealing taste. Of commercially available low calorie and/or low carbohydrate containing products, the present finished chocolate products are the most appealing from the aspect of their smoothness and excellent taste. The present new products are characterized by a low carbohydrate content and reduced caloric content.

The compositions of this invention include ground cocoa beans, added cocoa butter, whole powdered milk, skin powdered milk, and sorbitol as the major constituents and as minor constituents, a flavoring agent, especially vanilla, lecithin and a cyclamate or other synthetic sweetner which provides a milk chocolate composition. For dark chocolate, the compositions include ground cocoa beans, added cocoa butter, soya flour and sorbitol as major constituents with a cyclamate or other synthetic sweetner and lecithin as minor constituents.

The amounts of each major constituent must be maintained at about specified levels to attain the desirable properties of the present new compositions whereas the minor constituents can vary to a slight degree, but their presence, in toto, should not exceed about 1 percent of the total weight of the major constituents.

The milk chocolate composition is as follows:

| | | |
|---|---|---|
| cocoa beans | about | 9% |
| whole milk powder | about | 15% |
| skim milk powder | about | 7% |
| sorbitol | about | 31% |
| cocoa butter (added) | about | 38% |
| cyclamate | about | 0.12% |
| lecithin | about | 0.6% |
| vanilla | about | 0.01% |
| The dark chocolate composition is as follows: | | |
| cocoa beans | about | 36% |
| sorbitol | about | 39% |
| soya flour | about | 4% |
| -continued | | |
| cocoa butter (added) | about | 21% |
| cyclamate | about | 0.12% |
| lecithin | about | 0.6% |

As is wellknown, cocoa beans contain about 50% cocoa butter. The percentage of cocoa butter, however, can vary in roasted cocoa beans, depending on the intensity of roasting, up to about 3 percent. When cocoa beans are roasted and ground, part of the cocoa butter can be removed, as by expression, to obtain cocoa which contains less cocoa butter, the cocoa butter content being a variable which usually lies in the range of from about 10 to about 30 percent. In the present compositions, it is preferred to use ground roasted cocoa beans but cocoa of reduced cocoa butter content can also be employed. However, the added cocoa butter should be adjusted from the level used when cocoa beans are employed to accommodate the reduced butter content of the cocoa so that the final compositions have a total fat content of about 44-45% for the milk chocolate and about 36% for the dark chocolate, which levels of fat are required for the outstanding properties of the chocolate products obtained from the new compositions of this invention. Thus, by using cocoa and/or cocoa beans together with added cocoa butter, the desired level of total fat content can be achieved by adjusting the level of added cocoa butter.

The present compositions are prepared with first quality cocoa, preferably prepared by fresh grinding roasted cocoa beans until the cocoa becomes glutinous at which point the additional cocoa butter, preferably melted, is then added, after which the remaining constituents are then added to the resulting mix which is then thoroughly mixed, with mixing continued until a completely uniform blend is obtained. In a preferred form of the invention, the mixing should be continued for about three days to obtain the most desirable properties in the resultant chocolate product.

After the mixing has been completed, the fluid mixture can then be formed into the desired shape by merely pouring into molds or forms. For best results, the fluid chocolate mixture should be allowed to cool to about 32° C. before being poured into the molds.

The procedure described employs standard apparatus commonly employed in the production of chocolate. The mixing operation can be carried out in a conche, or other suitable mixing device capable of agitating the mixture. During the mixing step, excessively high temperatures should be avoided because of possible adverse effects on the chocolate taste.

The lecithin employed in the present compositions can be any of the usual commercial forms which are preferably purified to remove impurities such as oil, sterols, waxes and coloring matter. Although lecithin is by far the most efficient, and therefore preferred, other emulsifiers can be substituted for lecithin without adversely affecting the resulting product, e.g. sorbitan monostearate, sorbitan mono-oleate, polyoxyethylene sorbitan monopalmitate and the like, i.e. the sorbitan monofatty acid esters and polyoxyethylenated derivates known under the commercial names of Spans and Tweens.

The synthetic sweetner of this invention is preferably a cyclamate sweetner, that is, a salt of N-cyclohexylsulfamic acid, preferably the sodium or calcium salt. An equivalent amount of other synthetic sweetner such as saccharin can be used in place of, in whole or in part, the cyclamate but the taste of the final product may not be of the same high order as with cyclamate. The difference in taste, however, may only be discernible by highly refined tasting ability. When saccharin is substituted for cyclamate, appropriately lesser amount should be used since saccharin is about ten times sweeter.

Sorbitol employed in the present compositions may be either crystalline or powdered. When powdered sorbitol is used, it is possible to reduce, if not completely omit, the synthetic sweetner, for which reason powdered sorbitol is usually preferred. Soya, a protein source, is preferably used in the highly divided state as in soya flour. This is also applicable to the whole and skim milk solids which are preferably in powder form which permits more reaady mixing into the chocolate composition.

Vanilla is a preferred flavorant although other flavoring materials can be employed, e.g. oil of peppermint and the like. When vanilla is incorporated into the chocolate mix, it is preferable to add it as the last ingredient when the mixer includes iron parts.

The surprisingly excellent smoothness and pleasant taste of the present new compositions is not fully understood and no theoretical explanation of the reasons therefor are advanced. Suffice it to say that, of all the possible permutations and combinations of ingredients as well as the respective levels thereof in the compositions, to the present only the new compositions as described herein have overcome the inherent difficulties of prior art dietetic compositions as to taste and smoothness. Thus, the use of the hereindescribed constituents at about the levels described in chocolate compositions yields a final chocolate product which is extremely pleasant to the taste but at the same time of substantially reduced carbohydrate content, and a somewhat lower caloric content as compared to normal chocolate products.

The following examples further illustrate the invention.

EXAMPLE 1

A milk chocolate compositions is prepared containing the following ingredients at the indicated levels:

| cocoa beans | 9 kg. |
| whole milk powder | 15 kg. |
| skim milk powder | 7 kg. |
| sorbitol powder | 31 kg. |
| added cocoa butter | 38 kg. |
| cyclamate sweetner | 0.12 kg. |
| lecithin | 0.6 kg. |
| vanilla (vanillin powder) | 0.01 kg. |

Roasted cocoa beans are ground in a conche until the cocoa melts to a glutinous mass and the cocoa butter is then added at a temperature of 40° C. The remaining ingredients are then added with the vanilla being last in the order of addition. Mixing is then continued for a period of three days and the mixture then poured into forms after it has cooled to about 32° C.

The resulting product has a very pleasant taste. Analysis of the product gives the following results:

| fat | 44.5 % |
| albumen | 6.6 % |
| carbohydrates | 8.6 % |
| water | 1.2 % |

EXAMPLE 2

A dark chocolate composition is prepared in accordance with the procedure of Example 1 with the following ingredients at the specified levels:

| cocoa beans | 36 kg. |
| sorbitol powder | 39 kg. |
| soya flour | 4 kg. |
| added cocoa butter | 21 kg. |
| cyclamate sweetner | 0.12 kg. |
| lecithin | 0.6 kg. |

The product has an excellent taste.
Analysis of the product gives the following results:

| carbohydrate | 2.6 % |
| fat | 36 % |
| albumen | 6.7 % |
| water | 1.1 % |

What is claimed is:

1. A dietetic chocolate composition comprising as major constituents about 9% cocoa beans, about 15% powdered whole milk, about 7% powdered skim milk, about 31% sorbitol and 38% added cocoa butter, and as minor constituents about an effective amount of a synthetic sweetener selected from the group consisting of cyclamate and saccharin about 0.6% lecithin and about 0.01% vanilla, the weight of said minor constituents being based on the total weight of the major constituents.

2. A dietetic dark chocolate composition comprising as major constituents about 36% cocoa beans, about 39% sorbitol, about 4% soya flour and about 21% added cocoa butter, minor constituents an effective amount of a synthetic sweetener selected from the group consisting of cyclamate and saccharin and as about 0.6% lecithin, the weight of said minor constituents being based on the total weight of the major constituents.

3. The chocolate composition of claim 1 wherein the artificial sweetener is 0.12% cyclamate.

4. The chocolate composition of claim 2 wherein the artificial sweetener is 0.12% cyclamate.

* * * * *